US00RE46961E

(19) United States
(12) Reissued Patent
Le

(10) Patent Number: US RE46,961 E
(45) Date of Reissued Patent: Jul. 24, 2018

(54) INFLATABLE PHOTO BOOTH

(71) Applicant: Tu Le, Playa Vista, CA (US)

(72) Inventor: Tu Le, Playa Vista, CA (US)

(21) Appl. No.: 29/587,323

(22) Filed: Dec. 12, 2016

Related U.S. Patent Documents

Reissue of:
(64) Patent No.: Des. 734,805
Issued: Jul. 21, 2015
Appl. No.: 29/496,425
Filed: Jul. 11, 2014

(51) LOC (11) Cl. ..... 16-01
(52) U.S. Cl.
USPC ..... D16/215
(58) Field of Classification Search
USPC ..... D16/215, 237; D25/16; D21/835
CPC ..... G03B 17/00; G03B 17/42; G03B 17/48; G03B 17/53; G03B 17/26; E04H 15/20; E04H 15/2015; E04H 15/201; E04H 2015/202; E04H 2015/204
See application file for complete search history.

(56) References Cited

U.S. PATENT DOCUMENTS 3,864,708 A * 2/1975 Allen ..... G03B 17/53 229/92.8
D241,333 S * 9/1976 Wheeler ..... D25/16
4,959,670 A * 9/1990 Thayer, Jr. ..... G03B 17/53 348/64
D324,873 S * 3/1992 Thayer ..... D16/215
5,262,815 A * 11/1993 Aumiller ..... G03B 17/53 348/E5.026
D363,993 S * 11/1995 Johnson et al. ..... D25/16
5,603,185 A * 2/1997 Murphy ..... A63B 9/00 446/220
D638,551 S * 5/2011 Gann ..... D25/16
D689,159 S * 9/2013 Wagoner ..... D21/835
2006/0005475 A1* 1/2006 Millar ..... B66B 11/0226 52/79.1
2008/0313969 A1* 12/2008 Colucci ..... G03B 21/585 52/2.18

(Continued)

*Primary Examiner* — Phillip S Hyder
(74) *Attorney, Agent, or Firm* — Fitzgerald IP Law; John K Fitzgerald

(57) CLAIM

The ornamental design for an inflatable photo booth, as shown and described.

DESCRIPTION

FIG. 1 is a top, [rear] *front* and right side perspective view of an inflatable photo booth showing my new design;
FIG. 2 is a [right side] *front* elevational view thereof;
FIG. 3 is a left side elevational view thereof;
FIG. 4 is a [front] *right side* elevational view thereof; *and,*
[FIG. 5 is a rear elevational view thereof; and,]
FIG. [6] *5* is a top plan view thereof.
[The broken lines portions of a photo booth representing the contour of inner wall structures are shown for illustrative purposes only and form no part of the claimed design.]

1 Claim, 5 Drawing Sheets

Figure 1:
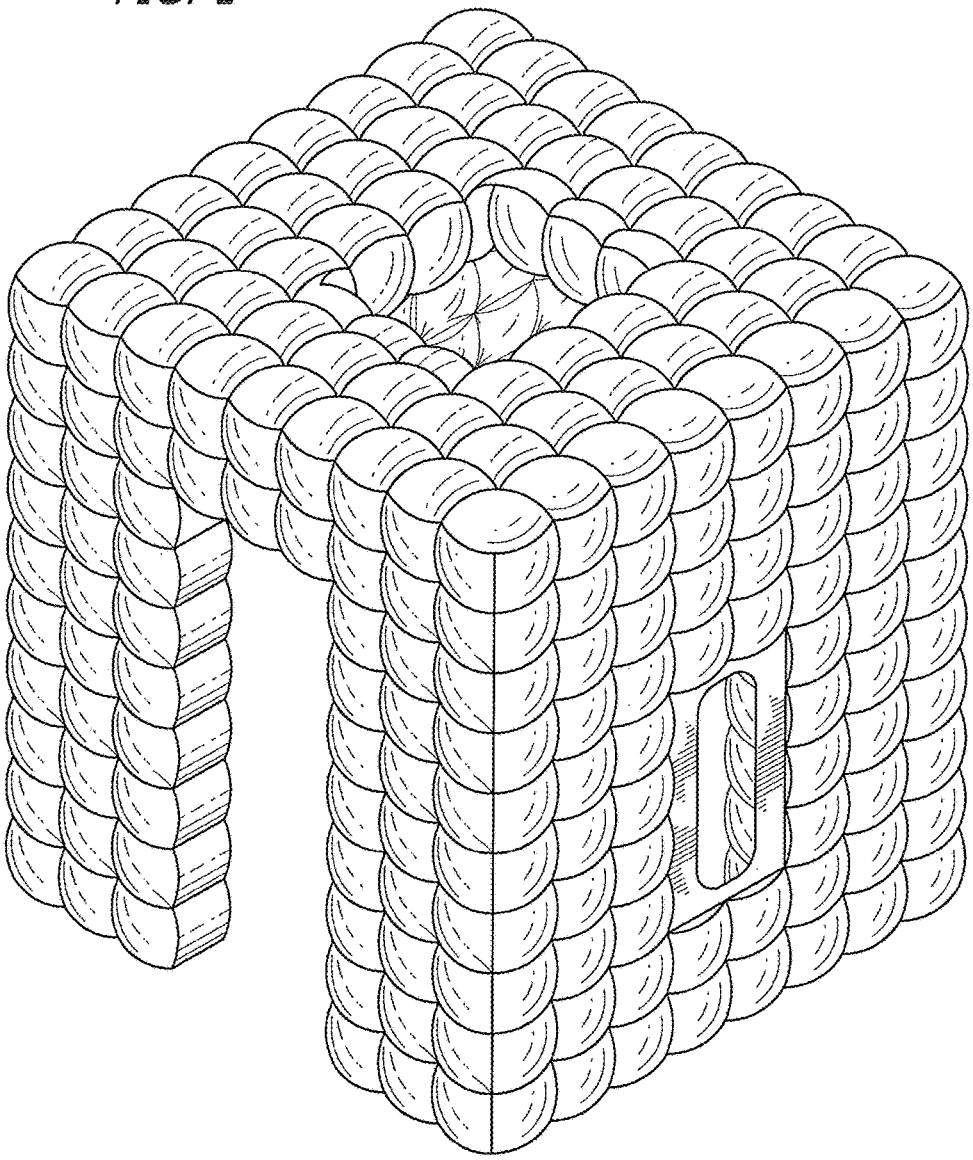
Figure 2:
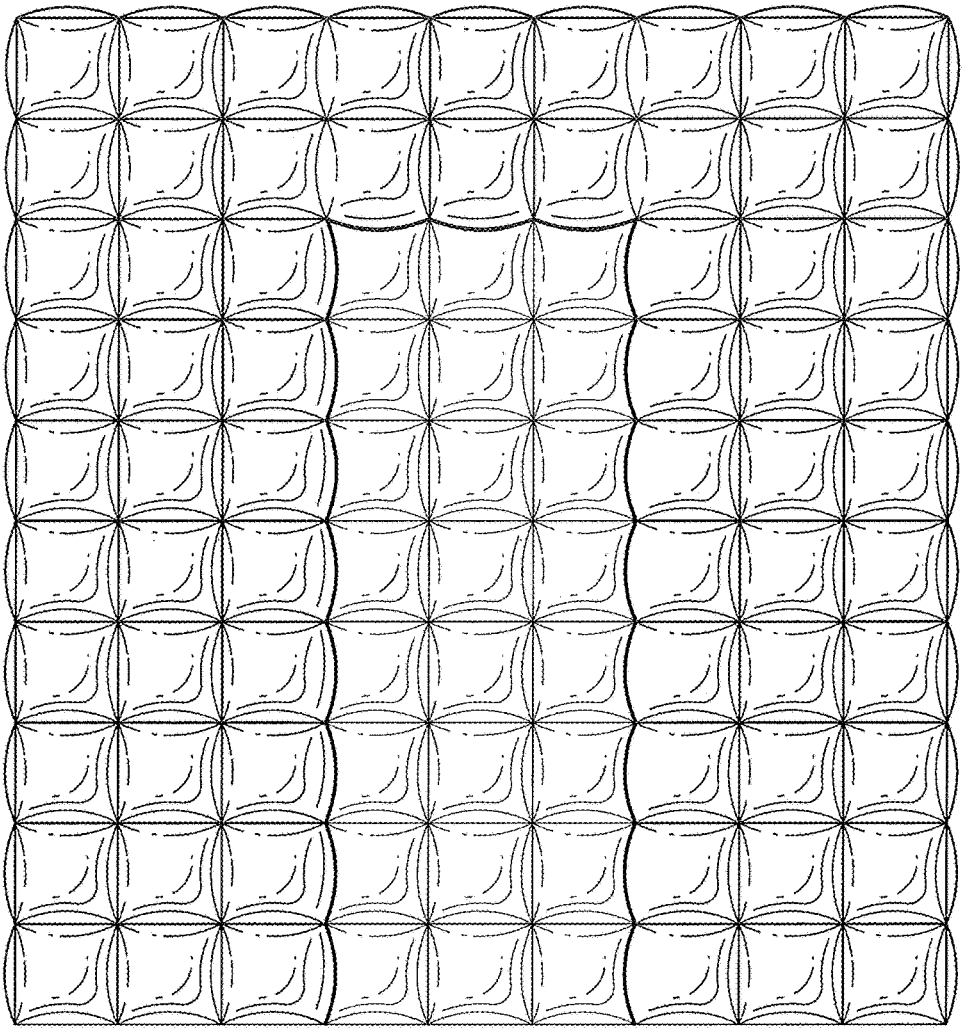
Figure 3:
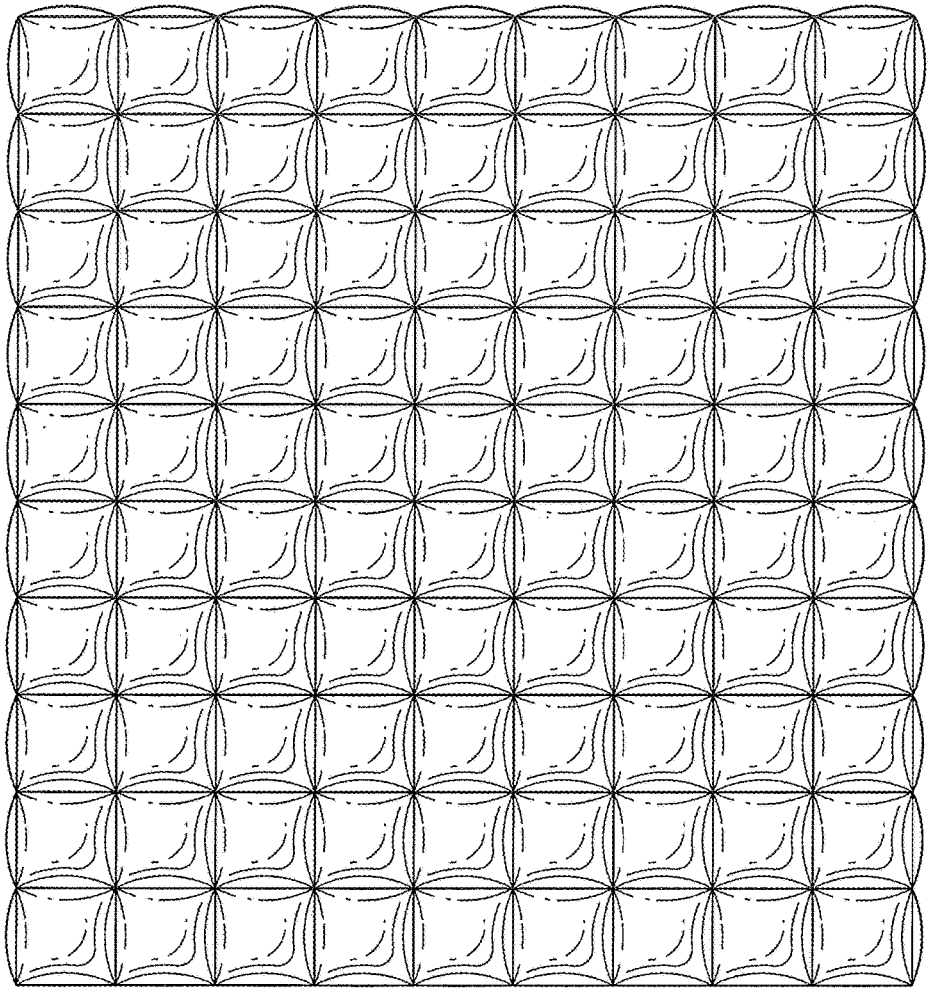

Matter enclosed in heavy brackets [ ] appears in the original patent but forms no part of this reissue; matter printed in italics indicates the additions made by reissue.

(56) References Cited

U.S. PATENT DOCUMENTS

| | | | | |
|---|---|---|---|---|
| 2009/0149111 | A1* | 6/2009 | Scherba | A63G 31/12<br>446/220 |
| 2012/0090248 | A1* | 4/2012 | Thompson | A63H 33/008<br>52/2.18 |

* cited by examiner

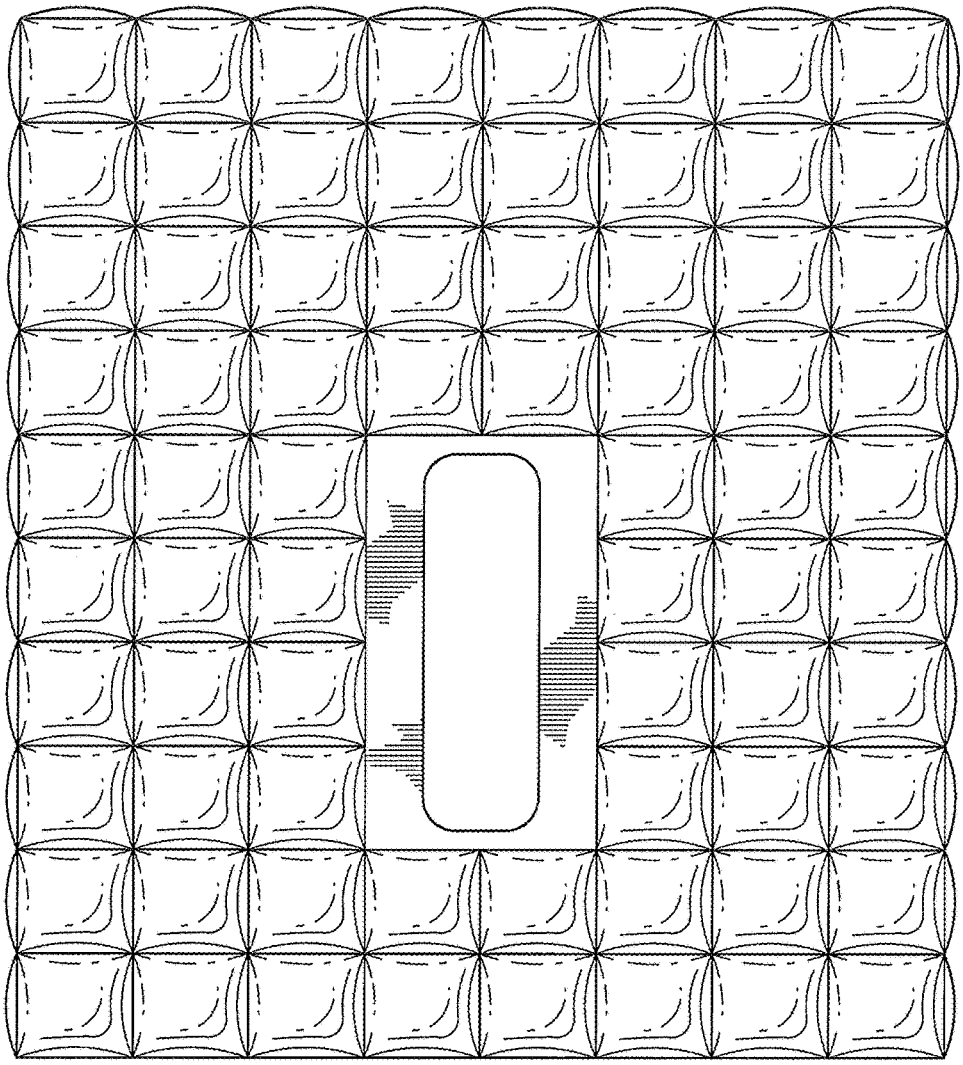
FIG. 4
AMENDED

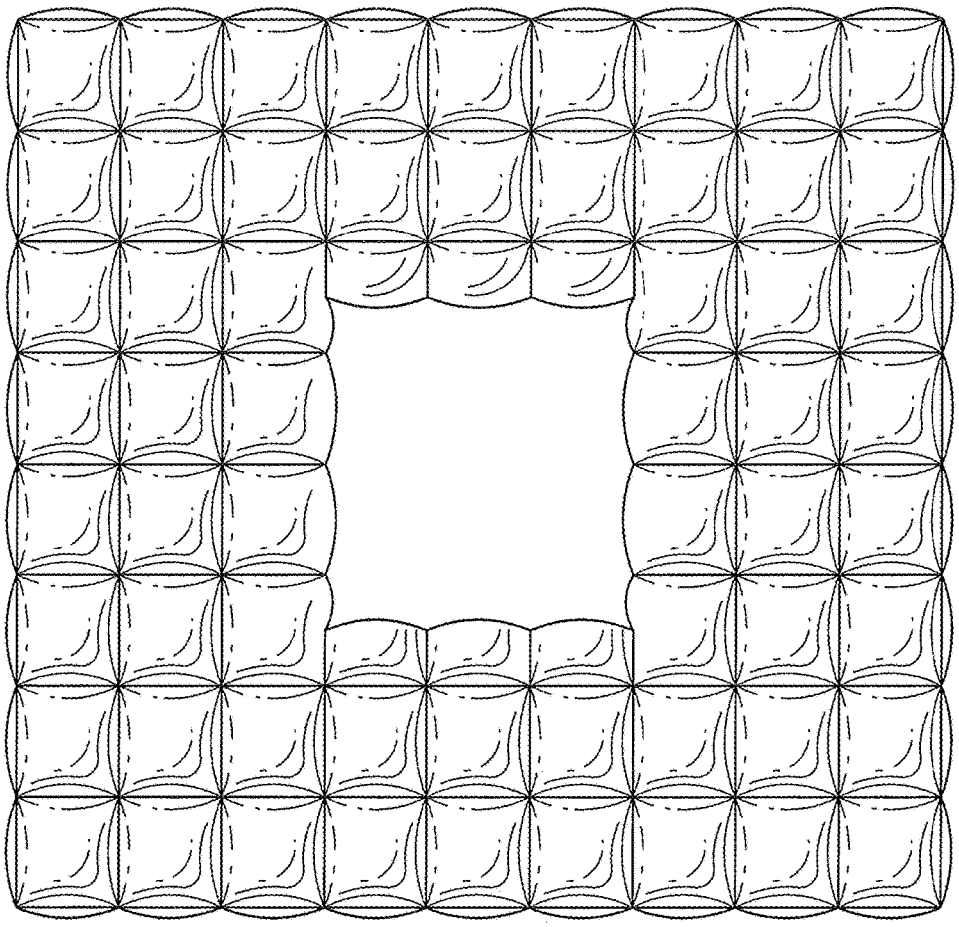
FIG. 5
AMENDED